United States Patent [19]

Zane

[11] Patent Number: 4,545,224

[45] Date of Patent: Oct. 8, 1985

[54] BICYCLE LOCK

[75] Inventor: Michael S. Zane, Cambridge, Mass.

[73] Assignee: KBL Corporation, Boston, Mass.

[21] Appl. No.: 545,832

[22] Filed: Oct. 27, 1983

[51] Int. Cl.⁴ .............................................. E05B 9/04
[52] U.S. Cl. .......................................... 70/39; 70/55; 70/233; 70/368; 70/370; 70/371; 70/380
[58] Field of Search ................ 70/371, 233, 367, 370, 70/368, 380, 18, 39, 31, 51-56, 38 R, 38 A, 38 B, 38 C

[56] References Cited

U.S. PATENT DOCUMENTS

| | | |
|---|---|---|
| 302,796 | 7/1884 | Taylor . |
| 596,080 | 12/1897 | Morse ................................. 74/551.9 |
| 1,343,438 | 6/1920 | Deibert ................................. 70/380 |
| 1,965,336 | 7/1934 | Fitzgerald .................... 70/DIG. 62 |
| 2,247,621 | 7/1941 | Speer ..................................... 70/380 |
| 3,721,112 | 3/1973 | Wellekens ............................... 70/39 |
| 3,855,826 | 12/1974 | Hori ................................... 70/38 A |
| 3,871,284 | 3/1975 | Krise ................................. 70/371 X |
| 3,924,426 | 12/1975 | Zane et al. .............................. 70/18 |
| 3,967,475 | 7/1976 | Zane ....................................... 70/18 |
| 4,064,716 | 12/1977 | Shwayder et al. .................. 70/39 X |
| 4,155,231 | 5/1979 | Zane et al. ............................. 70/18 |

FOREIGN PATENT DOCUMENTS

| | | | |
|---|---|---|---|
| 245898 | 7/1963 | Australia ........................... 70/38 A |
| 92289 | 11/1961 | Denmark ........................... 70/38 B |
| 388160 | 1/1924 | Fed. Rep. of Germany ...... 70/38 C |
| 491840 | 2/1930 | Fed. Rep. of Germany ...... 70/38 C |
| 182417 | 10/1922 | United Kingdom ................... 70/39 |

Primary Examiner—Gary L. Smith
Assistant Examiner—Lloyd A. Gall
Attorney, Agent, or Firm—Morse, Altman & Dacey

[57] ABSTRACT

A locking device for securing a bicycle or the like to a post or other fixture. The locking device features a replaceable lock cylinder, which in turn allows for both replacing merely the lock cylinder when the keys get lost and also allows for conforming the lock cylinder of the device to an identical lock cylinder used in the owner's home so that one key, preferably a flat key, services both the device and the home. The lock cylinder cannot, however, be removed when the device is locked and in use. The key, on the other hand, can only be removed when the device is locked.

6 Claims, 14 Drawing Figures

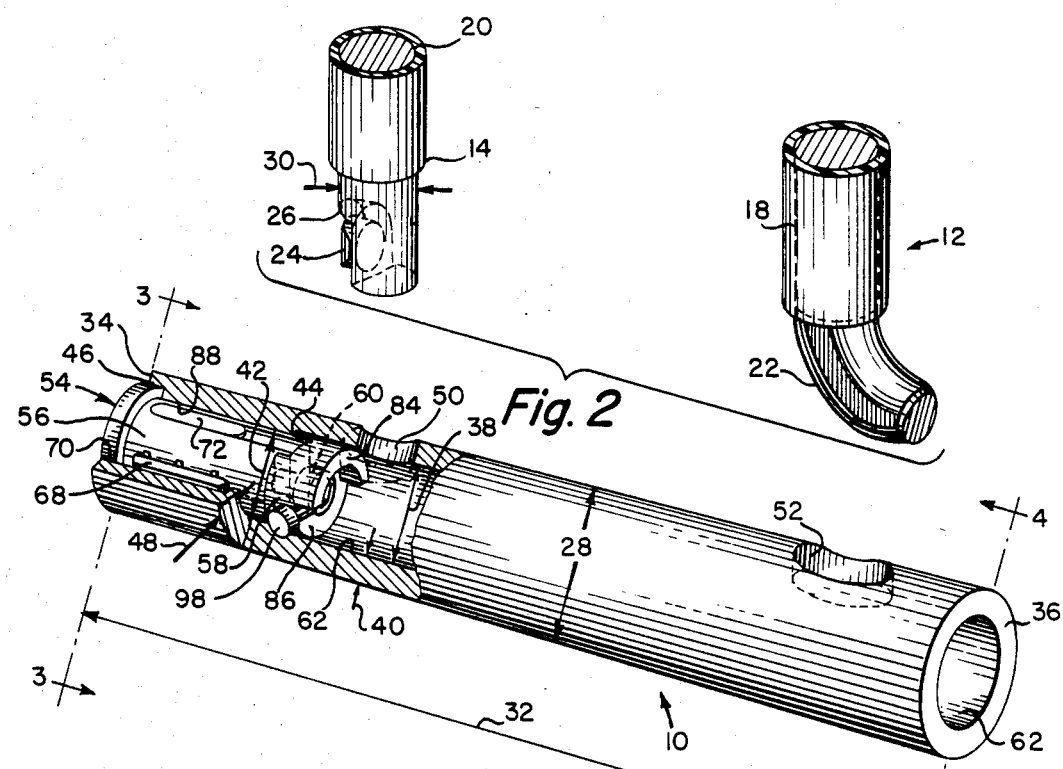
Fig. 2
Fig. 1
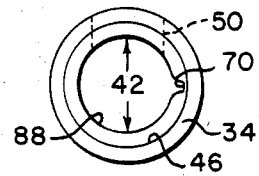
Fig. 3
Fig. 4
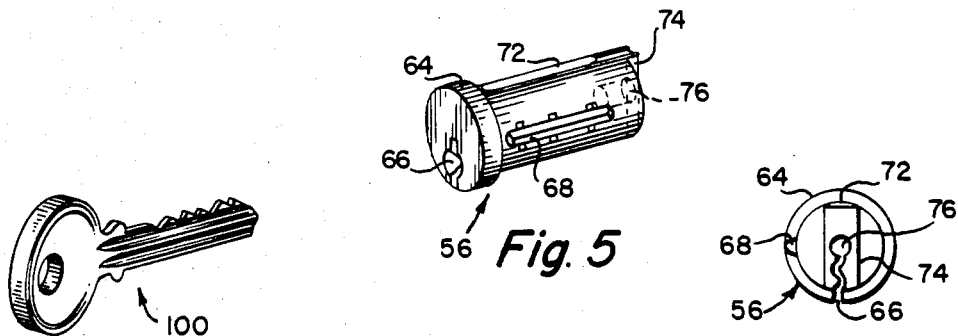
Fig. 7
Fig. 5
Fig. 6

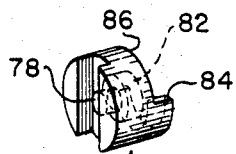
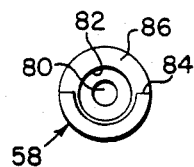
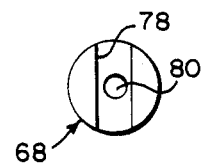
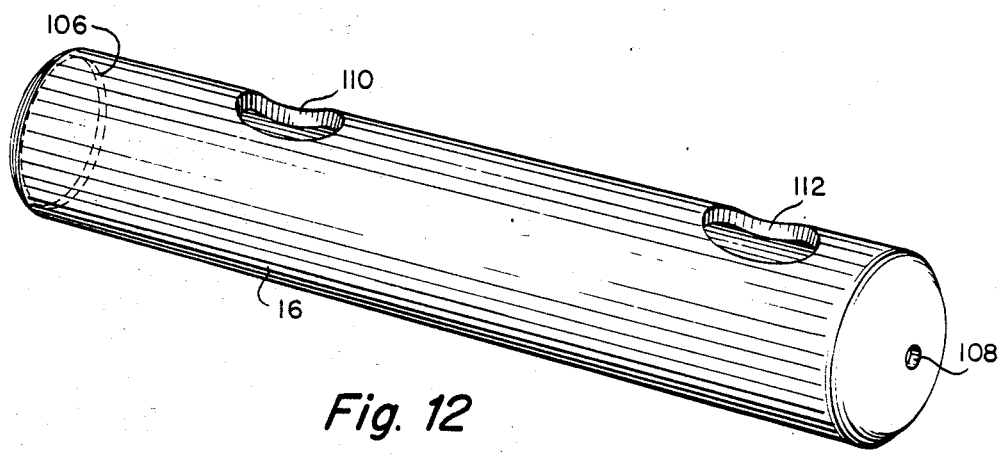
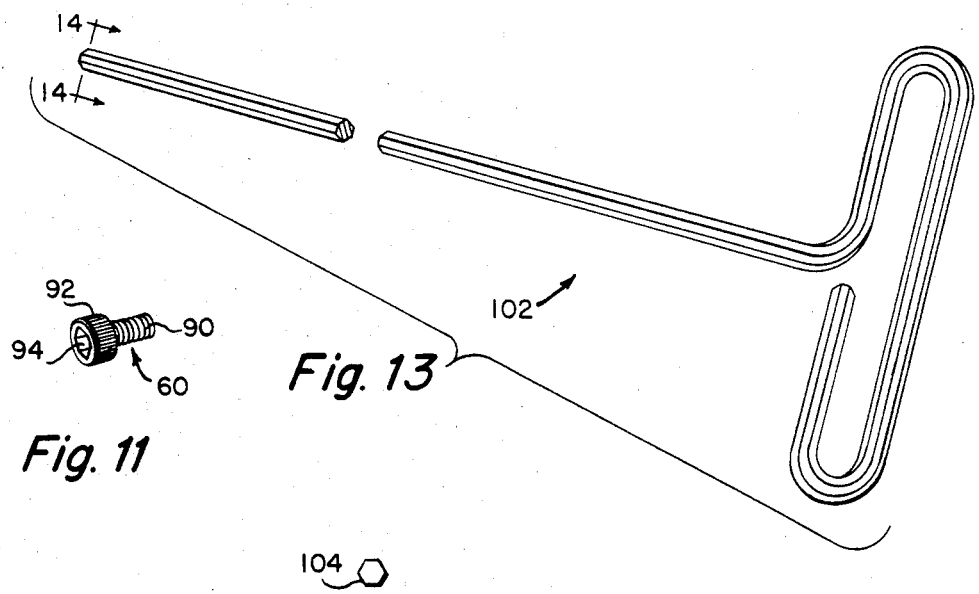

BICYCLE LOCK

BACKGROUND OF THE INVENTION

1. Field of the Invention

The present invention relates generally to locking devices and, more particularly to an improved locking device for bicycles, motorcycles, scooters, mopeds and the like.

2. The Prior Art

During the past decade, the numbers of bicycles, motorcyles, scooters, mopeds and the like in daily use has increased dramatically. Some of these items are now quite expensive. Thefts of the items also have shot up. These items, once stolen, represent not only considerable loss to their owners but also are difficult to trace and to recover. Professional and some not so professional thieves nowadays frequently employ a bolt cutter or the like to sever quickly and quietly cables, chains or other devices used to secure bicycles and the like to posts or other fixed objects. To guard thereagainst, large heavy locks have been developed comprising rigid U-shaped shackles and cross bars designed to attach to the ends of the shackles. See U.S. Pat. Nos. 3,924,426; 3,967,475 and 4,155,231. These devices offer good resistance to bolt cutters, hack saws and the like. The devices are however awkward since their owners need to carry a further set of keys, which keys for the most part are of the circular type. Further, once these circular keys are lost, the devices become unusable to their owners, requiring their full replacement. In the absence of a circular or other key which to duplicate, only experienced locksmiths are in a position to duplicate a circular or other key to fit a specific lock cylinder. Such duplication effort frequently is more costly however than simply replacing the entire bicycle lock itself.

SUMMARY OF THE INVENTION

It is a principal object of the present invention to overcome the above disadvantages by providing a locking device of improved construction for bicycles and the like.

More specifically, it is an object of the present invention to provide a locking device for bicycles and the like of the kind including a U-shaped shackle and a cooperating cross bar adapted to lock across the ends of the shackle, and comprising a lock cylinder, a cam and a retaining member for removably securing the cam and the lock cylinder in one end of the cross bar. The construction is such that the lock cylinder cannot be removed when the U-shaped shackle is locked in place in the cross bar, while preferably the key to the locking device can only be removed from the lock cylinder when the cam-cylinder combination is in the locked position. Preferably, the key is a flat key and the interchangeability of the lock cylinder allows the user to use but one key for both the locking device and a door in his home. In case of a lost key, the entire locking device need no longer be discarded, it being sufficient to replace the lock cylinder with a new lock cylinder.

Other objects of the present invention will in part be obvious and will in part appear hereinafter.

The invention accordingly comprises the locking device of the present disclosure, its components, parts and their interrelationships, the scope of which will be indicated in the appended claims.

BRIEF DESCRIPTION OF THE DRAWINGS

For a fuller understanding of the nature and objects of the present invention, reference is to be made to the following detailed description, which is to be taken in connection with the accompanying drawings, wherein:

FIG. 1 is a view in perspective and partly in section of one component of a locking device for bicycles and the like constructed in accordance with the present invention;

FIG. 2 is a perspective but fragmentary view of a second component of the locking device;

FIG. 3 is an end view in the direction of the arrows 3—3 of the first component shown in FIG. 1 but with certain operative parts removed for clarity;

FIG. 4 is a view similar to FIG. 3 but showing the other end of the first component;

FIG. 5 is a perspective view of a first operative part of the first component shown in FIG. 1;

FIG. 6 is a front elevation of the part shown in FIG. 5;

FIG. 7 is a perspective view of a key for the part shown in FIG. 5;

FIG. 8 is a perspective view of a second operative part of the first component shown in FIG. 1;

FIG. 9 is one end view of the part shown in FIG. 8;

FIG. 10 is the opposite end view of the part shown in FIG. 8;

FIG. 11 is a perspective view of a third operative part of the first component shown in FIG. 1;

FIG. 12 is a perspective view of a cover for the first component shown in FIG. 1;

FIG. 13 is a fragmentary perspective view of a tool for servicing the operative parts of the first component; and FIG. 14 is an end view in the direction of the arrows 14—14 of the tool shown in FIG. 13.

DETAILED DESCRIPTION OF THE PREFERRED EMBODIMENT

Generally, the illustrated embodiment of a locking device for securing bicycles and the like to a fixed object, such as a post, comprises a cross bar 10 shown in perspective and partly in section in FIG. 1 and a U-shaped shackle 12 shown in fragmentary perspective in FIG. 2.

Both the cross bar 10 and the shackle 12 preferably are made from a heat treated high grade hardened steel, and both are sufficiently sturdy and thick to present effective resistance to the action of a bolt cutter or to a hacksaw. The cross bar 10 is of tubular construction while the shackle 12 preferably is made from solid cylindrical rod stock. A covering skin 14 is shown provided on the outer surface of the shackle 12. The covering skin 14 is provided to protect the finished surfaces of the bicycle against scratching when the locking device is applied. The covering skin 14 may be clear or colored and preferably is made of plastic or rubber and is applied to the shackle 12 in any known manner as by dipping or by fitting a flexible sleeve over the shackle 12, as desired. The cross bar 10 preferably also is provided for the same reason with a protective covering skin 16, shown as a flexible sleeve in perspective in FIG. 12.

The shackle 12 is generally U-shaped and formed with a pair of legs 18 and 20 of substantially the same length. The legs 18 and 20 can be parallel or oval, depending on the end use. The leg 18 terminates in a bent end or foot 22, bent approximately 90° outwardly, substantially as shown. The leg 20 is straight and terminates at its lower end with a cutaway portion including an outwardly facing shoulder or boss 24, the apex of which does not project sideways beyond the periphery of the leg 20. The cutaway portion also includes a curved shoulder 26 directly above the boss 24.

It is to be noted that the outer diameter 28 of the cross bar 10 is somewhat greater than the diameter 30 of the rod stock used to form the shackle 12. The length 32 of the cross bar 10 between its respective ends 34 and 36 is of course determined whether it is for use on a bicycle or a larger vehicle, such as a motorcycle. With respect to a bicycle, the preferred length 32 is about 7½ inches.

The cross bar 10 is a tube formed with at least two different sizes of inside diameters: one inside diameter 38, which not only is larger than a second inside diameter 42 but which also extends over most of the length 32 of the cross bar 10. At the point where the two inside diameters 38 an 42 meet, a shoulder 44 is formed. It of course follows that the wall thickness 40 of the cross bar 10 for its greater length is somewhat less than the thickness 48 closer its end 34. Preferably, at the end 34, the cross bar 10 also features a counter-bore 46.

The cross bar 10 further is formed with a pair of aligned openings 50 and 52 in the sidq thereof. The openings 50 and 52 are spaced apart from one another by a distance corresponding to the distance between the legs 18 and 20 of the U-shaped shackle 12. The opening 52 is located near the end 36 of the cross bar 10 and is oblong while the opening 50 is circular and is located near the end 34.

Mounted within the cross bar 10 and adjacent its end 34 is a locking mechanism 54. The locking mechanism 54 essentially comprises three operative parts: a lock cylinder 56, a cam 58 and a retaining member 60 releasably securing the cam 58 to the cylinder 56. The cam 58 and the retaining member 60 are designed to be admitted into the cross bar 10 from its end 36, featuring a larger bore 62 with the greater internal diameter 38. The cam 58 is designed to fit snugly within the bore 62 and will slide along its axial length until it comes to rest against the shoulder 44. The lock cylinder 56 on the other hand is designed to be admitted into the cross bar 10 from its other end 34, featuring a smaller bore 88 with the smaller internal diameter 42. Preferably, the lock cylinder 56 is provided with a rim 64, which is designed to fit snugly into the counter-bore 46 so that the outer face of the cylinder 56, featuring a key hole 66, is substantially flush with the end 34 of the cross bar 10.

Preferably, the lock cylinder 56 is a MEDECO lock cylinder made by the Medeco Security Locks, Inc., Salem, Va., or one of similar quality and design. As such, the lock cylinder 56 is provided with a locking member 68 protruding from its periphery, observe FIG. 5, substantially along its axial length. The locking member 68 is designed to fit within a cooperating locking groove 70 formed in the side of the bore 88, observe FIG. 3. The locking member 68 has two operative positions: a locked position wherein the tumbler pins of the cylinder 56 force it to project rigidly from the periphery of the cylinder 56, and an unlocked position wherein the tumbler pins are released by a key 100 inserted into the key hole 66 and thus allow for the member 68 to be pushed into the cylinder 56 so as to be flush with its periphery. Consequently, with the key 100, which preferably is a flat key such as found in most households, absent from the key hole 66, the cylinder 56 is prevented from rotating within the bore 88 by the locking member 68. When the key 100 is inserted, however, all the way into the key hole 66, the tumbler pins are released and the locking member 68 can be eased out of the locking groove 70 by simply turning the key 100, allowing for the rotation of the cylinder 56 within the bore 88. The tumbler pins preferably are shielded both from view and tampering by a suitable cover plate 72.

At its inward end, the lock cylinder 56 is formed with an integral cam bar 74 which is designed snugly to fit within a depression 78 formed in one end of the cam 58, observe FIGS. 8 and 10. The cam bar 74 further is provided with an internally threaded hole 76.

The cam 58 is best described with reference to FIGS. 8-10. The cam 58 is essentially tubular and is formed with an axial hole 80, surrounded by a depression 82, a moon-shaped curved operative locking segment 84 and a shoulder 86, all formed at the cam's end opposed to the channel 78.

The cam 58 is designed to be secured to the lock cylinder 56 by means of the retaining member 60, which preferably is an Allen-head screw as shown in FIG. 11. The retaining member 60 is formed with an externally threaded portion 90, designed to mesh with the internally threaded hole 76 of the lock cylinder 56, and a head portion 92 featuring a hexagonal depression 94. The retaining member 60 is operated by means of a long-stemmed Allen-head wrench 102 shown in FIG. 13. The wrench 102 is formed with a flat hexagonal face 104, shown in FIG. 14, which fits snugly into the hexagonal depression 94 of the retaining member 60.

Care must be exercised during the initial assembly of the cam-cylinder combination 56 and 58 within the cross bar 10 with respect to the proper orientation of the cam 58, in particular its moon-shaped curved operative locking segment 84. Preferably the lock cylinder 56 is inserted first into the cross bar 10. Its orientation is of course assured by the locking member 68 sliding into its cooperative locking groove 70. With the lock cylinder 56 in place within the bore 88, the cam 58 is inserted, with its channel 78 facing toward the cylinder 56, at the other end 36 into the bore 62. In mating the channel 78 over the cam bar 74, it is imperative that the moon-shaped curved operative locking segment 84 be in its locking position as shown in FIG. 1. As may be observed, this locking position is achieved when the moon-shaped curved operative locking segment 84 of the cam 58 partially obstructs the circular opening 50 of the cross bar 10. With the key hole 66 of the lock cylinder 56 facing downward, the moon-shaped curved operative locking segment 84 of the cam 58 will be facing upward.

With the cam 58 properly oriented, it is then secured to the lock cylinder 56 by means of the retaining screw 60. Due to its hexagonal depression 94, the screw 60 fits snugly over the end 104 of the Allen-head wrench 102 and can be conveniently inserted thereby through the long bore 62 and into the axial hole 80 of the cam 58 until it makes contact with the tapped hole 76 of the lock cylinder 56. By then tightening the screw 60, the cam 58 not only is secured to the lock cylinder 56 but the combination cam-cylinder also is secured within the cross bar 10 by the cam 58 abutting tightly against the shoulder 44 formed inside the cross bar 10, observe FIG. 4. The cam-cylinder 56,58 combination is securely held in place within the cross bar 10 by the combined actions of the rim 64 fitting into the counter-bore 46 on the one hand and of the cam 58 abutting against the shoulder 44 on the other hand.

With the cam-cylinder combination 56 and 58 securely held in place by the retaining screw 60 within the cross bar 10, the same preferably is enclosed with a covering skin 16, shown in FIG. 12. The skin 16 preferably is formed of the same material as the skin 14 and as a sleeve, having a large opening 106 at one end and a small opening 108 at the other end, and a pair of aligned openings 110 and 112 designed to fit over the pair of openings 50 and 52 of the cross bar 10. It will be appreciated that the opening 110 is circular and the opening 112 is oblong in shape.

If one wishes to change the lock cylinder 56, neither the skin covering 16 nor the cam 58 need be removed. Rather, one introduces the Allen-head wrench 102 through the small opening 108 until it finds its mark, i.e., the hexagonal depression 94 of the retaining screw 60. Once the screw 60 is removed from the tapped hole 76, the lock cylinder 56 simply is slid from the bore 88 via the opening 106 and then replaced by another lock cylinder of identical dimensions, albeit operable by a different key 100.

In reassembly, care must once again be exercised about the orientation of the cam 58 so that its moon-shaped curved operative locking segment 84 again partially obstructs the circular opening 50 of the cross bar 10, this being the locking position for the cam 58. With the insertion of the key 100 into the key hole 66, the locking bar 68 is released. Then by turning the key 100, the locking bar 68 pops out of the locking groove 70 and allows for the rotational displacement of both the lock cylinder 56 and the thereto attached cam 58 from its shown locked position to an unlocked position. In the unlocked position, the moon-shaped curved operative locking segment 84 of the cam 58 is substantially as illustrated in FIGS. 8 and 9, i.e., leaving unblocked thereby the entire area of the circular opening 50 of the cross bar 10. Preferably, a pin 98 is mounted so as to protrude into the bore 62 substantially as shown in FIG. 1 to arrest the rotation of the cam 58 in its unlocked position.

With the cam 58 in the unlocked position, the U-shaped shackle 12 now can be mated to the cross bar 10 by first inserting the bent foot 22 into the oblong opening 52 by tilting the shackle 12 with respect to the cross bar 10. With the bent foot 22 in place, the shackle 12 again is tilted to bring the cutaway end of the leg 20 into the circular opening 50 until it is fully inserted therein. The lock cylinder-cam combination 56 and 58 is again rotated, by turning the key 100, from the open, unlocked position to the closed, locked position. It will by appreciated that in the locked position, the moon-shaped curved operative locking segment 84 of the cam 58 locks between the boss 24 and the curved shoulder 26 of the leg 20. With the locking device now locked, the key 100 is removed from the key hole 66. The locking bar 68 now effectively prevents rotation of the lock cylinder 56 and the thereto secured cam 58, effectively keeping the legs 18 and 20 of the U-shaped shackle 12 united to the cross bar 10. It will of course be further appreciated that with the foot 22 in place within the bore 62, the retaining screw 60 cannot be unscrewed, hence the lock cylinder 56 cannot be removed.

Thus has been shown and described an improved locking device for securing a bicycle or the like to a fixture, which device satisfies the objects and advantages set forth above.

Since certain changes may be made in the present disclosure without departing from the scope of the present invention, it is intended that all matter described in the foregoing specification or shown in the accompanying drawings, be interpreted in an illustrative and not in a limiting sense.

What is claimed is:

1. A locking device for bicycles and the like, comprising:
    (a) a U-shaped shackle and a tubular cross bar adapted to lock across the open end of said shackle;
    (b) a replaceable cam-cylinder combination operatively mounted in one end of said tubular cross bar;
    (c) a retaining member for securing said cam to said combination, replaceably mounting thereby said cam-cylinder combination in said one end of said tubular cross bar;
    (d) said tubular cross bar being formed with two different sizes of internal diameter defining a shoulder against which said cam abuts, said cam and said retaining member being admitted into said tubular cross bar from one end thereof and said cylinder being admitted therein from the other end thereof;
    (e) said cylinder being disposed within said tubular cross bar in a section defined by the smaller size of said two different sizes of internal diameters;
    (f) said U-shaped shackle defining means for preventing said cylinder of said cam-cylinder combination from being replaceable when said cross bar is mated to said U-shaped shackle, and said cylinder being provided with a rim and said cross bar being formed with a counter-bore to accomodate said rim;
    (g) said rim cylinder being operable by means of a flat key being insertable into and removable from said cylinder only when said cam-cylinder combination is in a locked position;
    (h) said cylinder being provided with a locking member and said tubular cross bar being provided with a locking groove to accomodate said locking member;
    (i) said tubular cross bar being provided with a pin to arrest the rotational displacement of said cam between its two operative positions: said locked position and an unlocked position.

2. The locking device of claim 1 wherein said cam-cylinder combination is replaceable only when said tubular cross bar is not mated in locking engagement to said U-shaped shackle.

3. The locking device of claim 1 wherein said retaining member is an Allen-head screw and further including an Allen-head wrench for operating said screw for securing said cam to said cylinder, and, wherein said cross bar is enclosed by a protective skin covering, said covering formed with a larger opening at one end to accomodate said cylinder and with a small opening at the other end to accomodate said Allen-head wrench.

4. The locking device of claim 1 wherein said cam is provided with a channel and said cylinder is formed with an integral bar designed to be accomodated within said channel, and wherein said cam is provided with an axial hole and said bar with a tapped hole to accomodate said retaining member.

5. A locking device for bicycles and the like comprising:
    (a) a U-shaped shackle and a tubular cross bar adapted to lock across the open end of said shackle;

(b) a cam-cylinder combination replaceably mounted in one end of said tubular cross bar;
(c) a retaining member for securing said cam to said cylinder;
(d) said tubular cross bar formed with bores of two different sizes of internal diameters defining a shoulder;
(e) said cylinder designed to fit into said bore within the smaller internal diameter and said cam into said bore within the larger internal diameter, said cam abutting against said shoulder;
(f) said cam being rotatable by said cylinder between an open position and a locking position;
(g) said cylinder being provided with a rim and said cross bar being formed with a counter-bore to accomodate said rim, said rim cylinder being operable by a flat key;
(h) said U-shaped shackle defining means for preventing said cylinder to said cam-cylinder combination from being replaceable when said cross bar is mated to said U-shaped shackle, and said flat key being insertable into and removable from said cylinder only when said cam is in said locking position;
(i) said cylinder being provided with a locking member radially along its axial length and with an integral bar at its end facing said cam and said smaller internal diameter bore being provided with an axial locking groove to accomodate said locking member, said cam being formed with a channel to accomodate said integral bar of said cylinder.

6. The locking device of claim 5 wherein said retaining member is an Allen-head screw, said cam is provided with an axial hole and said integral bar of said cylinder with a tapped hole both to accomodate said Allen-head screw, and further including an Allen-head wrench for turning said screw so as to secure said cam to said cylinder.

* * * * *